United States Patent
Someya (10) Patent No.: US 6,822,637 B2
(45) Date of Patent: Nov. 23, 2004

(54) APPARATUS, METHOD AND PROGRAM FOR GENERATING IMAGE SIGNAL HAVING POINTER SIGNAL

(75) Inventor: Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 260 days.

(21) Appl. No.: 10/265,237

(22) Filed: Oct. 7, 2002

(65) Prior Publication Data

US 2003/0179179 A1 Sep. 25, 2003

(30) Foreign Application Priority Data

Mar. 20, 2002 (JP) .......................................... 2002-078338

(51) Int. Cl.$^7$ ................................................. G09G 5/08
(52) U.S. Cl. ........................................ 345/157; 345/1.1
(58) Field of Search ................................. 345/156, 157, 345/158, 159, 160, 163, 168, 169, 173, 754, 856, 857, 858, 1.1, 1.2, 1.3, 2.1, 2.2, 2.3

(56) References Cited

U.S. PATENT DOCUMENTS

| | | | | |
|---|---|---|---|---|
| 5,047,754 A | * | 9/1991 | Akatsuka et al. | ........... 345/163 |
| 5,634,018 A | * | 5/1997 | Tanikoshi et al. | ........... 345/751 |
| 5,694,150 A | * | 12/1997 | Sigona et al. | ............... 345/856 |
| 5,838,300 A | * | 11/1998 | Takagi et al. | ................ 345/700 |
| 6,069,615 A | * | 5/2000 | Abraham et al. | ........... 345/168 |
| 6,542,148 B1 | * | 4/2003 | Tanaka et al. | .............. 345/157 |
| 6,738,028 B2 | * | 5/2004 | Asahi et al. | .................. 345/1.1 |
| 6,759,996 B1 | * | 7/2004 | Someya et al. | .............. 345/1.1 |
| 2003/0179155 A1 | * | 9/2003 | Someya | ....................... 345/1.1 |

FOREIGN PATENT DOCUMENTS

| | | |
|---|---|---|
| JP | 5-127856 | 5/1993 |
| JP | 5-249932 | 9/1993 |
| JP | 2000-352962 | 12/2000 |

* cited by examiner

Primary Examiner—Xiao Wu
(74) Attorney, Agent, or Firm—Birch, Stewart, Kolasch & Birch, LLP (57) ABSTRACT

An image signal generating apparatus, method, program and storage medium for causing display units to display individual images. The apparatus includes a signal generator, an indexer adding an index signal, and a pointer controller controlling addition or non-addition of a pointer signal. The apparatus also includes an output circuit transmitting the image signal, thereby causing the display unit having identification data corresponding to the index signal to display an image, and a central controller controlling in such a way that the pointer signal is not added to the image signal during at least one frame period from a first time point that is at least one frame period previous to a second time point at which the display unit for displaying the one page image based on a received image signal is changed by changing the index signal added to the image signal for each frame.

20 Claims, 6 Drawing Sheets

CONVENTIONAL ART

APPARATUS, METHOD AND PROGRAM FOR GENERATING IMAGE SIGNAL HAVING POINTER SIGNAL

This nonprovisional application claims priority under 35 U.S.C. § 119(a) on patent application Ser. No. 2002-078338 filed in Japan on March 20, 2002, which is herein incorporated by reference.

BACKGROUND OF THE INVENTION

1. Field of the Invention

The present invention relates to an image signal generating apparatus that causes a plurality of display units each having their own identification data to display individual images, an image signal generating method that is implemented by the aforementioned image signal generating apparatus, a program for causing a computer system to implement the aforementioned image signal generating method, and a computer-readable information storage medium that contains the aforementioned program.

2. Description of the Related Art

The Japanese Patent Kokai (Laid-Open) Publication No. 2000-352962 published on Dec. 19, 2000 discloses a system wherein a single image signal generating apparatus (e.g., a personal computer) causes a plurality of display units (e.g., CRT monitors or liquid crystal monitors) to display individual images. The display units used in the system hold their own identification data (e.g. their own identification numbers (ID Nos. or Unit Nos.)) respectively. The image signal generating apparatus used in the system transmits an image signal for each frame including an index signal to all the display units connected thereto.

Each of the display units judges whether or not the index signal added to the received image signal for each frame coincides with its own identification data. The display unit that has an identification data coinciding with the index signal, displays an image based on the image signal for each frame having the index signal (that is, the display unit rewrites the contents of its image memory). On the other hand, the display unit that has an identification data not coinciding with the index signal, ignores the received image signal for each frame having the index signal and does not change the displaying image (that is, the display unit does not change the contents of its image memory).

In this system, the plurality of display units that receive the same image signal transmitted from a single image signal generating apparatus can display an image in a time division manner (e.g., by changing an index signal to be added to the image signal for each frame whenever a predetermined number of frame periods has passed) or selectively (e.g., on the display unit selected by the user). As a result, only by connecting the single image signal generating apparatus with the plurality of display units by means of a connection cable or cables, a single image can be displayed on a broad area made up of the display regions of the plurality of display units, or a plurality of windows to be displayed based on the application software can be displayed on the respective display regions of the plurality of display units.

Figure 11:
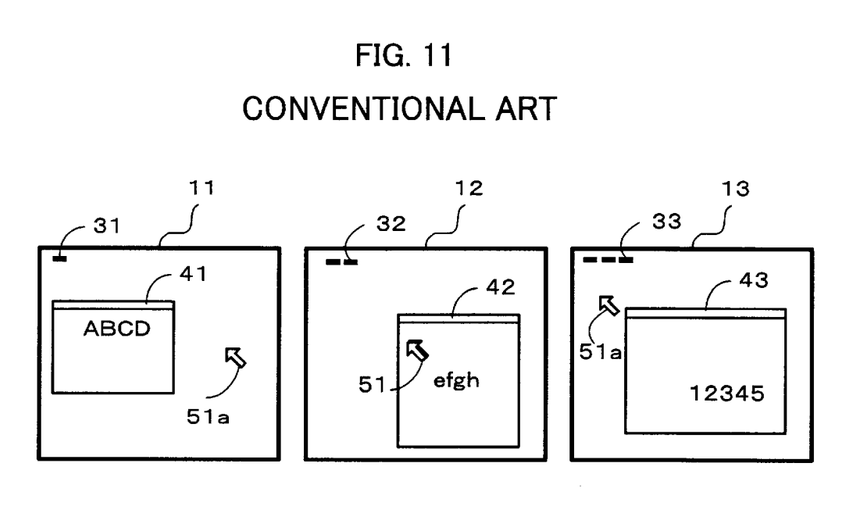
FIG. 11 is a diagram for explaining images displayed on the respective display regions of the three display units on the basis of an image signal generated by a conventional image signal generating apparatus.

In the aforementioned conventional system, however, when the individual images each including a mouse pointer are displayed on the respective display regions of the plurality of display units, the mouse pointers 51 and 51a are displayed on all the display units 11, 12 and 13 respectively, as shown in FIG. 11. For this reason, it is difficult for the user to draw a distinction between the mouse pointer 51 and the mouse pointers 51a, wherein the mouse pointer 51 (movable by a mouse operation) is displayed on the display unit (which is one of the display units selected by the index signal and corresponds to the display unit 12 in FIG. 11) based on the image signal being received from the image signal generating apparatus, and the mouse pointers 51a (immovable by a mouse operation) are displayed on the display units (which correspond to the display units 11 and 13 in FIG. 11) based on the data remaining in the respective image memories of the display units.

SUMMARY OF THE INVENTION

It is an object of the present invention to provide an apparatus, method, and program for generating an image signal that permits displaying a pointer on only a selected one of display units, and a computer-readable information storage medium containing the aforementioned program.

According to an aspect of the present invention, an image signal generating apparatus which transmits an image signal to a plurality of display units each having identification data, includes an image signal generator which sequentially generates an image signal for each frame that is an image signal for displaying one page image in one frame period, the one page image being an image to be displayed on each of the plurality of display units; an indexer which adds an index signal to the image signal for each frame; and a pointer controller which controls addition or non-addition of a pointer signal to the image signal for each frame, the pointer signal being a signal for displaying a pointer on each of the plurality of display units. The image signal generating apparatus also includes an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame; and a central controller which controls the pointer controller in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

According to another aspect of the present invention, an image signal generating apparatus which transmits an image signal to a plurality of display units each having identification data, includes an image signal generator which sequentially generates an image signal for each frame that is an image signal for displaying one page image in one frame period, the one page image being an image to be displayed on each of the plurality of display units; an indexer which adds an index signal to the image signal for each frame; and a pointer controller which controls addition or non-addition of a pointer signal to the image signal for each frame, the pointer signal being a signal for displaying a pointer on each of the plurality of display units. The image signal generating apparatus also includes an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame; and a central controller which controls the indexer and the pointer controller. The central controller controls the indexer in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame. The central controller controls the pointer controller in such a way that the pointer signal is not added to the image signal for each frame during at least one frame period from a third time point that is at least one frame period previous to the first time point.

According to a further aspect of the present invention, an image signal generating method for transmitting an image signal to a plurality of display units each having identification data, includes sequentially generating an image signal for each frame that is an image signal for displaying one page image in one frame period, the one page image being an image to be displayed on each of the plurality of display units; adding an index signal to the image signal for each frame; and controlling addition or non-addition of a pointer signal to the image signal for each frame, the pointer signal being a signal for displaying a pointer on each of the plurality of display units. The image signal generating method also includes sequentially transmitting the image signal for each frame to the plurality of display units, thereby causing any of the plurality of display units having identification data corresponding to the index signal added to the transmitted image signal for each frame to display an image based on the transmitted image signal for each frame; and controlling the pointer controller in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

According to a further aspect of the present invention, an image signal generating method for transmitting an image signal to a plurality of display units each having identification data, includes sequentially generating an image signal for each frame that is an image signal for displaying one page image in one frame period, the one page image being an image to be displayed on each of the plurality of display units; adding an index signal to the image signal for each frame; and controlling addition or non-addition of a pointer signal to the image signal for each frame, the pointer signal being a signal for displaying a pointer on each of the plurality of display units. The image signal generating method also includes sequentially transmitting the image signal for each frame to the plurality of display units, thereby causing any of the plurality of display units having identification data corresponding to the index signal added to the transmitted image signal for each frame to display an image based on the transmitted image signal for each frame; controlling the indexer in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling the pointer controller in such a way that the pointer signal is not added to the image signal for each frame during at least one frame period from a third time point that is at least one frame period previous to the first time point.

According to a further aspect of the present invention, a computer-readable information storage medium contains a program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units. The image signal processing includes adding an index signal to the image signal for each frame; and controlling addition or non-addition of a pointer signal to the image signal for each frame, the pointer signal being a signal for displaying a pointer on each of the plurality of display units. The image signal processing also includes sequentially transmitting the image signal for each frame to the plurality of display units, thereby causing any of the plurality of display units having identification data corresponding to the index signal added to the transmitted image signal for each frame to display an image based on the transmitted image signal for each frame; and controlling in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

According to a further aspect of the present invention, a computer-readable information storage medium contains a program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units. The image signal processing includes adding an index signal to the image signal for each frame; controlling addition or non-addition of a pointer signal to the image signal for each frame, the pointer signal being a signal for displaying a pointer on each of the plurality of display units; and sequentially transmitting the image signal for each frame to the plurality of display units, thereby causing any of the plurality of display units having identification data corresponding to the index signal added to the transmitted image signal for each frame to display an image based on the transmitted image signal for each frame. The image signal processing also includes controlling in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling in such a way that the pointer signal is not added to the image signal for each frame during at least one frame period from a third time point that is at least one frame period previous to the first time point.

According to a further aspect of the present invention, a program causes a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units. The image signal processing includes adding an index signal to the image signal for each frame; and controlling addition or non-addition of a pointer signal to the image signal for each frame, the pointer signal being a signal for displaying a pointer on each of the plurality of display units. The image signal processing also includes sequentially transmitting the image signal for each frame to the plurality of display units, thereby causing any of the plurality of display units having identification data corresponding to the index signal added to the transmitted image signal for each frame to display an image based on the transmitted image signal for each frame; and controlling in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

According to a further aspect of the present invention, a program causes a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units. The image signal processing includes adding an index signal to the image signal for each frame; controlling addition or non-addition of a pointer signal to the image signal for each frame, the pointer signal being a signal for displaying a pointer on each of the plurality of display units; and sequentially transmitting the image signal for each frame to the plurality of display units, thereby causing any of the plurality of display units having identification data corresponding to the index signal added to the transmitted image signal for each frame to display an image based on the transmitted image signal for each frame. The image signal processing also includes controlling in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling in such a way that the pointer signal is not added to the image signal for each frame during at least one frame period from a third time point that is at least one frame period previous to the first time point.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
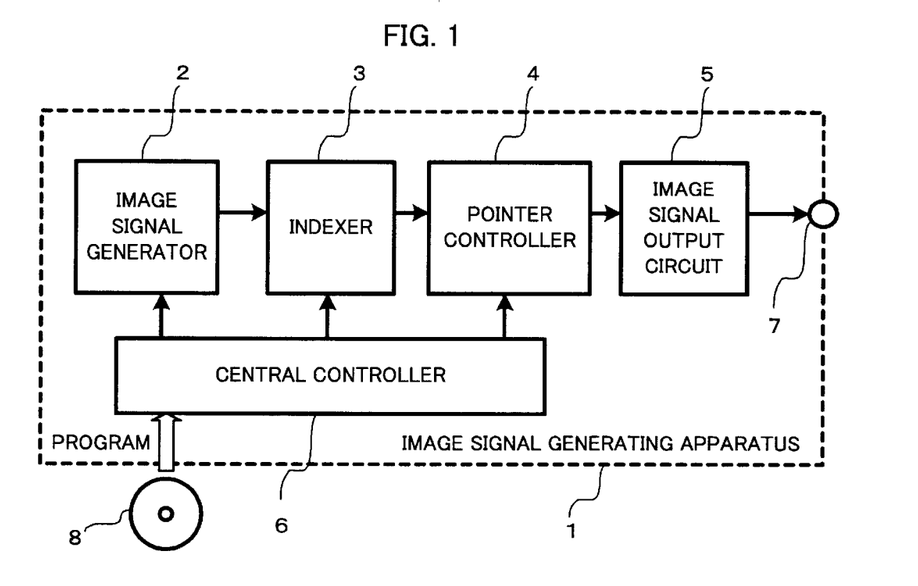
FIG. 1 is a schematic block diagram showing a configuration of an image signal generating apparatus in accordance with a first, second, or third embodiment of the present invention.

FIG. 1 shows a configuration of an image signal generating apparatus 1 in accordance with the first embodiment of the present invention (or an apparatus that implements an image signal generating method in accordance with the first embodiment). Further, FIG. 2 shows the image signal generating apparatus 1 in accordance with the first embodiment and first, second and third display units 11, 12 and 13 connected to the image signal generating apparatus 1.

The image signal generating apparatus 1 is, for example, a personal computer. The first, second and third display units 11, 12 and 13 are, for example, monitors connected to the image signal generating apparatus 1 by a connection cable 10 or other means such as a wireless communication. Although three display units 11, 12 and 13 are illustrated in FIG. 2, the number of the display units to be connected to the image signal generating apparatus 1 may be two or less, or four or more. Further, the connection cable 10 is branched halfway (e.g., by a distributor) in FIG. 2. However, if each display unit has not only an input terminal for receiving an image signal but also an output terminal for outputting the received image signal, the image signal generating apparatus 1 and the display units 11, 12 and 13 can be connected in series by connection cables.

Figure 2:
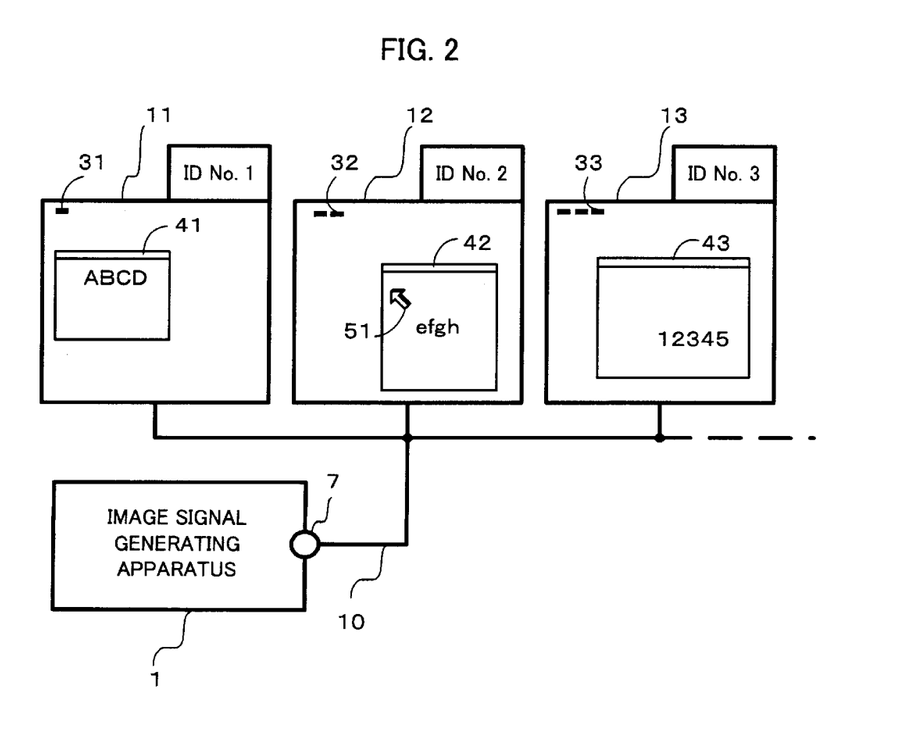
FIG. 2 is a diagram showing the image signal generating apparatus of FIG. 1 and a plurality of display units connected to the image signal generating apparatus of FIG. 1.

Referring to FIG. 2, the display units 11, 12 and 13 hold different identification data such as ID No.1, ID No.2 and ID No.3 respectively. In this way, in the first embodiment, by connecting an output terminal 7 of the image signal generating apparatus 1 with one end of the connection cable 10 and connecting the display units 11, 12 and 13 with the other ends of the connection cable 10, different images can be displayed on the respective display units 11, 12 and 13. When it is desired to display an identical image on some of the display units, it is only required to set identical identification data for such display units.

Referring to FIG. 1, the image signal generating apparatus 1 includes an image signal generator 2, an indexer 3, a pointer controller 4, an image signal output circuit 5, a central controller 6, and an output terminal 7. In this connection, the positions of the indexer 3 and the pointer controller 4 may be reversed. The constituent elements 2 through 6 incorporated into the image signal generating apparatus 1 are parts necessary for explaining the function of the image signal generating apparatus 1 and are illustrated separately. However, these parts are not always required to be provided as clearly separated in an actual circuit configuration. The operations of the image signal generator 2, indexer 3, pointer controller 4 and central controller 6 are executed under control of a computer program previously installed in the central controller 6, under control of a computer program installed from a computer-readable information storage medium 8 such as a magnetic disk or an optical disk, or under control of a computer program installed through downloaded from the Internet or the like.

Assume that one page (or one page image) is an image to be displayed on one of the display units 11, 12 and 13, the image signal generator 2 generates and outputs sequentially an image signal for each frame for displaying the one page image. In other words, the image signal generator 2 generates and outputs an image signal for displaying one page image from one frame to another. The image signal is generated, for example, under control of application software. The image signal includes, for example, information about a plurality of windows 41, 42 and 43 for data input and output and information about a single image to be displayed on a broad display area made up of the display regions of the display units 11, 12 and 13.

The indexer 3 adds an index signal to an image signal for each frame issued from the image signal generator 2. The index signal is a signal corresponding to identification data (such as identification number) previously set (e.g., by an exclusive switch, dial or through operation of a menu on the display screen) for each of the display units 11, 12 and 13. The addition of the index signal by the indexer 3 is carried out by adding an index signal to an image signal for each frame or by replacing part of an image signal for each frame with an index signal. The index signal is expressed, for example, by a combination of maximum and minimum values of a gray scale representation.

The pointer controller 4 controls addition or non-addition of a signal (i.e., a pointer signal) for displaying a pointer 51 such as a mouse pointer or a cursor on the display unit 11, 12 or 13 to an image signal for each frame.

The image signal output circuit 5 transmits an image signal for each frame to the plurality of display units 11, 12 and 13 through the output terminal 7. The format of the output signal of the image signal output circuit 5 may be any one of an analog format, a transmission minimized differential signaling (TMDS) format, a low voltage differential signaling (LVDS) format, and a digital signal format such as an optical signal format.

The central controller 6 controls the image signal generator 2, indexer 3 and pointer controller 4. The central controller 6 controls the pointer controller 4 in such a way that a signal (i.e., a pointer signal) for displaying a pointer is not added to the image signal for each frame during at least one frame period from a first time point $t_1$ (or $t_4$) that is at least one frame period previous to a second time point ($t_2$ or $t_5$ in FIG. 5) at which the display unit for displaying the one page image based on a received image signal is changed (i.e., a page is changed) by changing the index signal added to the image signal for each frame. In the first embodiment, a period of time during which the pointer signal is not added to the image signal for each frame is from the first time point ($t_1$ or $t_4$ in FIG. 5) to the second time point ($t_2$ or $t_5$ in FIG. 5). In other words, the central controller 6 controls the pointer controller 4 not so as to display a pointer 51a shown in FIG. 11.

Figure 3:
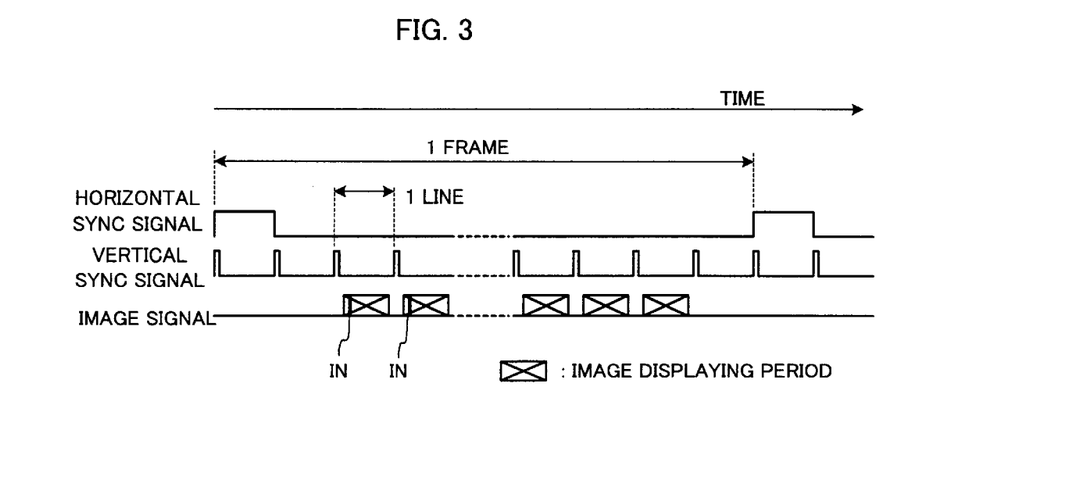
FIG. 3 is a timing chart for explaining how to add an index signal to an image signal for each frame in the image signal generating apparatus of FIG. 1.

FIG. 3 is a timing chart for explaining how to add an index signal IN to an image signal for each frame in the image signal generating apparatus 1 in accordance with the first embodiment. FIG. 3 shows an example when a part of an image signal for each frame (within an image displaying period) between two lines at a predetermined position in one frame is replaced with an index signal IN. As shown in FIG. 3, the indexer 3 adds the index signal to the image signal for each frame by replacing the part of the image signal by the index signal IN at the predetermined position during the image displaying period. Since the part of the image signal during the image displaying period is replaced with the index signal IN (i.e., the index signal IN is superposed), images (e.g., images denoted by reference numerals 31, 32 and 33 in FIG. 2) corresponding to the index signal IN appear in the display regions of the display units 11, 12 and 13. For this reason, it is desirable that the images corresponding to the index signal IN be displayed at unnoticeable positions (e.g., in the vicinity of corners of the display regions) in the display regions. Further, the index signal may be transmitted during a non-displayed interval or blanking interval of the image signal.

Figure 4:
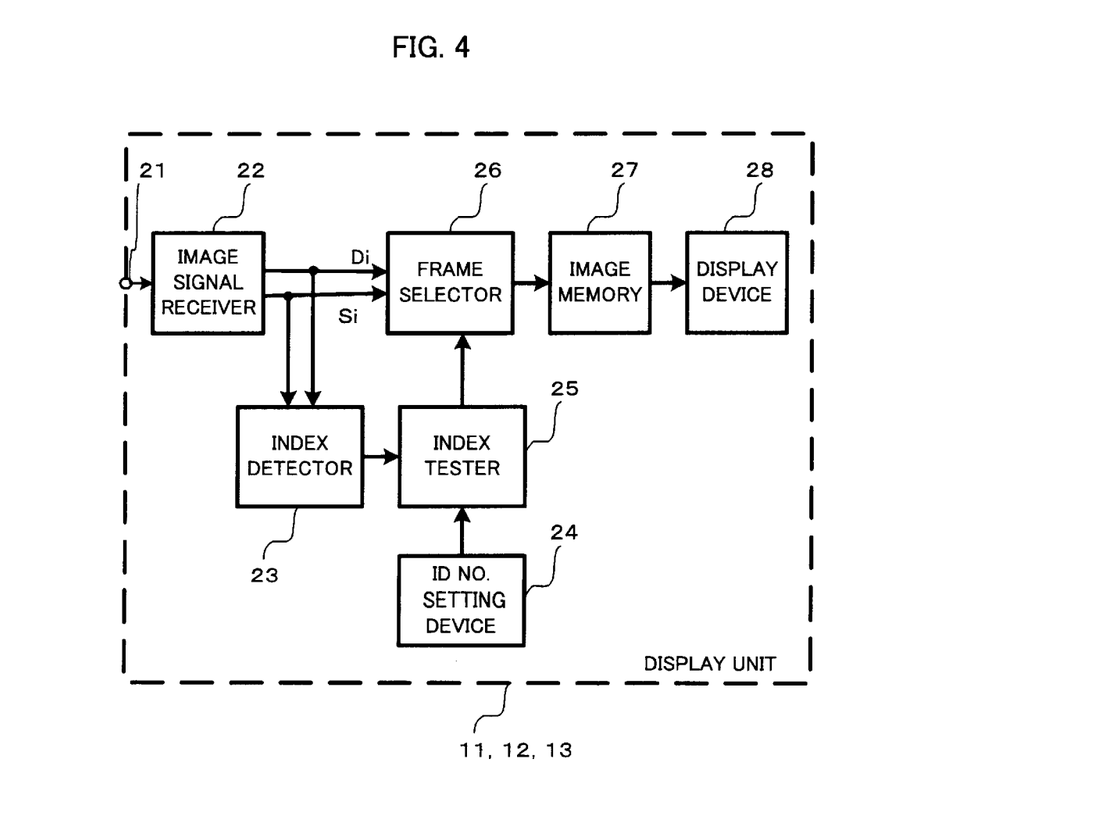
FIG. 4 is a schematic block diagram showing a configuration of a display unit to be connected to the image signal generating apparatus of FIG. 1.

FIG. 4 is a schematic block diagram showing a configuration of the display unit 11, 12 or 13 to be connected to the image signal generating apparatus 1 in accordance with the first embodiment. Referring to FIG. 4, each of the display units 11, 12 and 13 includes an input terminal 21, an image signal receiver 22, an index detector 23 for binarizing a received index signal on the basis of a preset threshold value, an identification number setting device 24 for setting identification numbers for the display units 11, 12 and 13, and an index tester 25 for determining whether or not the index signal added to an image signal for each frame corresponds to the identification number set in the corresponding display unit.

Each of the display units 11, 12 and 13 further includes a frame selector 26 for determining whether or not the frame is sent to an image memory 27 on the basis of a judgement result of the index tester 25, the aforementioned image memory 27, and a display device 28. In FIG. 4, a reference symbol Di denotes an image signal issued from the image signal receiver 22, and Si denotes a synchronizing signal issued from the image signal receiver 22. With such a configuration, when the index signal added to an image signal for each frame corresponds to the set identification number, each of the display unit 11, 12 and 13 stores the image signal for one frame in the image memory 27 and displays it on the display device 28.

Figure 5:
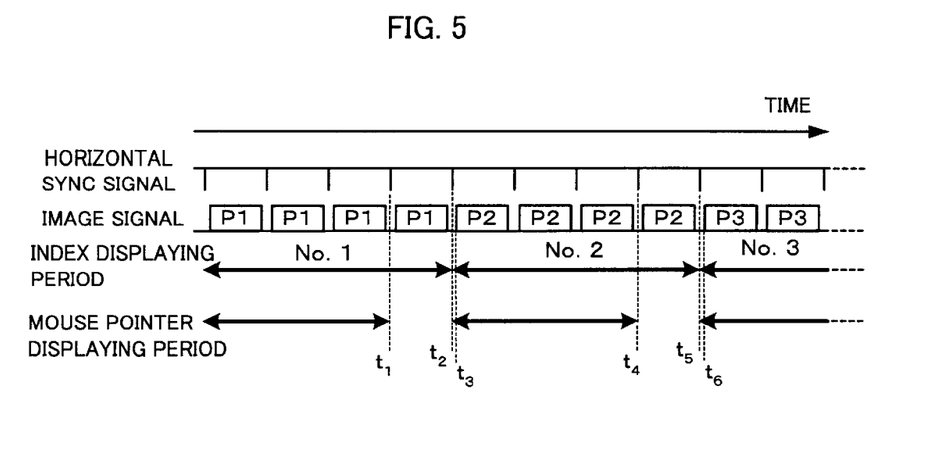
FIG. 5 is a timing chart for explaining an operation at the time of a page change in the image signal generating apparatus in accordance with the first embodiment.

FIG. 5 is a timing chart for explaining an operation at the time of the page change in the image signal generating apparatus 1 in accordance with the first embodiment. In FIG. 5, each of reference symbols P1 denotes a first-page image signal to be displayed on the first display unit 11, each of reference symbols P2 denotes a second-page image signal to be displayed on the second display unit 12, and each of reference symbols P3 denotes a third-page image signal to be displayed on the third display unit 13. Four frames of the first-page image signal P1 arranged sequentially in time, four frames of the second-page image signal P2 arranged sequentially in time, and two frames of the third-page image signals arranged sequentially in time are shown in FIG. 5.

As shown in FIG. 5, when the image signal generator 2 generates the first-page image signal P1, the image signal generator 2 adds the index signal (No. 1 in FIG. 5) corresponding to the identification number (No. 1 in FIG. 2) of the first display unit 11. Further, when the image signal generator 2 generates the second-page image signal P2, the image signal generator 2 adds the index signal (No. 2 in FIG. 5) corresponding to the identification number (No. 2 in FIG. 2) of the second display unit 11. Furthermore, when the image signal generator 2 generates the third-page image signal P3, the image signal generator 2 adds the index signal (No. 3 in FIG. 5) corresponding to the identification number (No. 3 in FIG. 2) of the third display unit 11.

The operation at the time of the page change (i.e., a changeover of the display units 11, 12 and 13) is carried out by a command from the central controller 6. The central controller 6 controls the pointer controller 4 in such a way that the pointer signal is not added to the image signal for each frame during at least one frame period from a first time point $t_1$ (or $t_4$) that is at least one frame period previous to a second time point $t_2$ (or $t_5$) at which the display unit for displaying the one page image based on a received image signal is changed by changing the index signal added to the image signal for each frame. A period of time during which the pointer signal is not added to the image signal for each frame is from the first time point $t_1$ (or $t_4$) to the second time point $t_2$ (or $t_5$). Since the period of time $t_1$ through $t_2$ (or $t_4$ through $t_5$), i.e., a pointer non-display period is provided, the pointer image will not be stored in the image memory (image memory 27 in FIG. 4) of the display unit that is not selected by the index signal.

Figure 6:
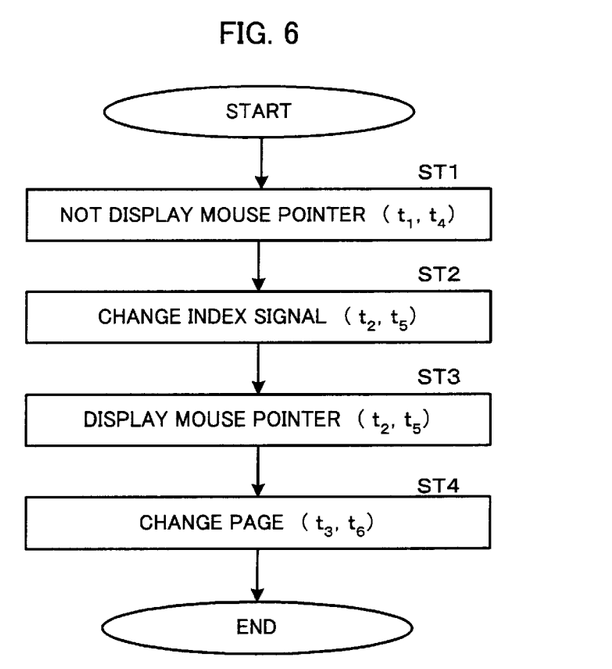
FIG. 6 is a flowchart showing the operation at the time of a page change in the image signal generating apparatus in accordance with the first embodiment.

FIG. 6 is a flowchart showing the operation at the time of the page change in the image signal generating apparatus 1 in accordance with the first embodiment. Referring to FIG. 6, at the time of the page change, the apparatus 1 causes the pointer not to be displayed temporarily at least one frame period (e.g., a period of time $t_1$ through $t_2$ or $t_4$ through $t_5$ in FIG. 5) in a step ST1. Next, the apparatus 1 changes the index signal added to the image signal to an index signal corresponding to the identification number of the next display unit in a step ST2 (a time point $t_2$ or $t_5$ in FIG. 5). Next, the apparatus 1 causes the pointer 51 to be displayed in a step ST3 (a time point $t_2$ or $t_5$ in FIG. 5). Next, in a step ST4, the apparatus 1 changes the page (image) and terminates the operation at the time of the page change (a time point $t_3$ or $t_6$ in FIG. 6).

As has been explained above, when the image signal generating apparatus 1 of the first embodiment, the image signal generating method that is implemented by the image signal generating apparatus, the program for implementing the method and the computer-readable information storage medium 8 containing the program are used in the operation at the time of the page change where the display units 11, 12 and 13 to be specified by the index signal are switched by changing the index signal, a signal for displaying a pointer is not added to the image signal for each frame during at least one frame period from a time point by at least one frame period previous to a time point of the page change. As a result, the pointer can be displayed only on the selected one of the display units that is specified by the index signal.

Second Embodiment

Figure 7:
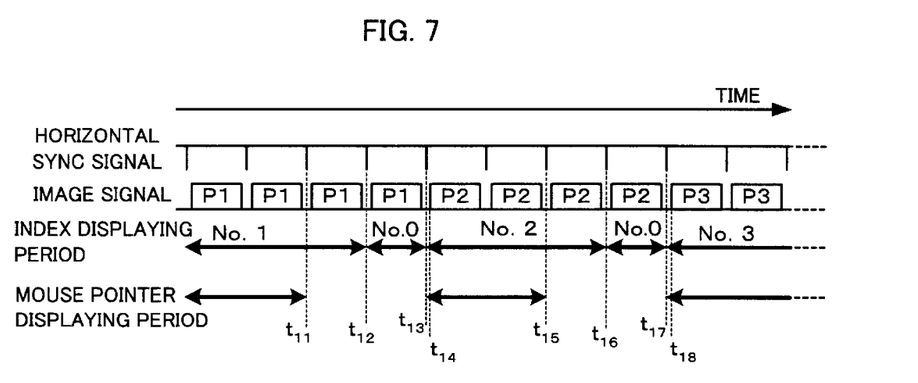
FIG. 7 is a timing chart for explaining an operation at the time of a page change in the image signal generating apparatus in accordance with the second embodiment of the present invention.
Figure 8:
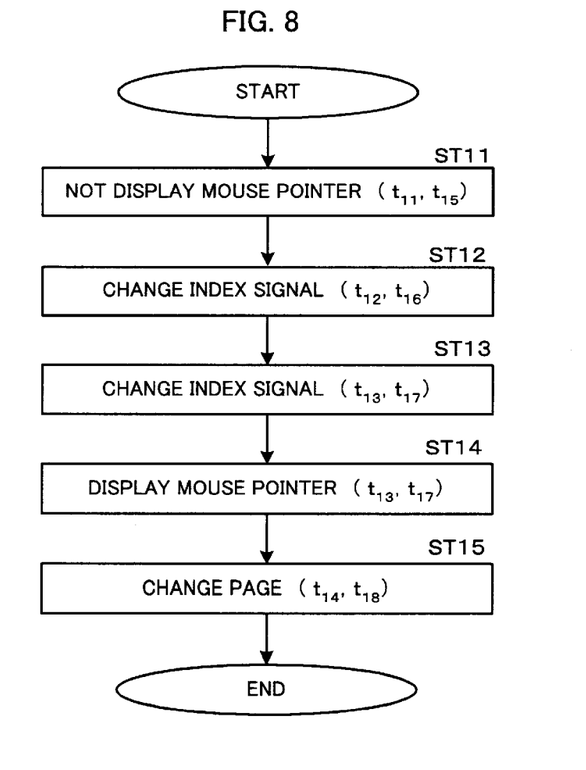
FIG. 8 is a flowchart showing the operation at the time of a page change in the image signal generating apparatus in accordance with the second embodiment.

FIG. 7 is a timing chart for explaining an operation at the time of a page change in the image signal generating apparatus 1 (that implements an image signal generating method) in accordance with the second embodiment of the present invention. Further, FIG. 8 is a flowchart showing the operation at the time of a page change in the image signal generating apparatus 1 in accordance with the second embodiment. The image signal generating apparatus of the second embodiment is different from that of the first embodiment only in the operation at the time of a page change. Accordingly, an explanation of the second embodiment will be made by referring to FIGS. 1 through 4.

In FIG. 7, each of reference symbols P1 denotes a first-page image signal to be displayed on the first display unit 11, each of reference symbols P2 denotes a second-page image signal to be displayed on the second display unit 12, and each of reference symbols P3 denotes a third-page image signal to be displayed on the third display unit 13. Four frames of the first-page image signal P1 arranged sequentially in time, four frames of the second-page image signal P2 arranged sequentially in time, and two frames of the third-page image signals arranged sequentially in time are shown in FIG. 7.

As shown in FIG. 7, when the image signal generator 2 generates the first-page image signal P1, the image signal generator 2 adds an index signal (No. 1 in FIG. 7) corresponding to the identification number (No. 1 in FIG. 2) of the first display unit 11 to the image signal for each frame. When the image signal generator 2 generates the second-page image signal P2, the image signal generator 2 adds an index signal (No. 2 in FIG. 7) corresponding to the identification number (No. 2 in FIG. 2) of the second display unit 12 to the image signal for each frame. When the image signal generator 2 generates the third-page image signal P3, the image signal generator 2 adds an index signal (No. 3 in FIG. 7) corresponding to the identification number (No. 3 in FIG. 2) of the third display unit 13 to the image signal for each frame.

The operation at the time of the page change (i.e., a changeover of the display units 11, 12 and 13) is carried out by a command from the central controller 6. The central controller 6 controls the indexer 3 in such a way that the index signal is changed to an invalid index signal (No. 0) corresponding to none of the identification data of the plurality of display units during at least one frame period from a first time point $t_{12}$ (or $t_{16}$) that is at least one frame period previous to a second time point $t_{13}$ (or $t_{17}$) at which the display unit for displaying the one page image based on a received image signal is changed (i.e., a page change is executed) by changing the index signal added to the image signal for each frame. Further, the central controller 6 controls the pointer controller 4 in such a way that the pointer signal is not added to the image signal for each frame during at least one frame period from a third time point $t_{11}$ (or $t_{15}$) that is at least one frame period previous to the first time point $t_{12}$ (or $t_{16}$). In the second embodiment, a period of time during which the pointer signal is not added to the image signal for each frame is from the third time point $t_{11}$ (or $t_{15}$) to the second time point $t_{13}$ (or $t_{17}$). Since the period of time $t_{11}$ through $t_{13}$ (or $t_{15}$ through $t_{17}$), i.e., a pointer non-display period is provided, the pointer image will not be stored in the image memory (image memory 27 in FIG. 4) of the display unit that is not selected by the index signal.

As has described above, the operation at the time of the page change in the image signal generating apparatus of the second embodiment is shown in FIG. 8. Referring to FIG. 8, in the operation at the time of the page change, the apparatus 1 causes the pointer not to be displayed temporarily at least one frame period (e.g. , a period of time $t_{11}$ through $t_{13}$ or $t_{15}$ through $t_{17}$) in a step ST11. Next, the apparatus 1 changes the index signal added to the image signal to an invalid index signal in a step ST12 (a time point $t_{12}$ or $t_{16}$ in FIG. 7). Next, the apparatus 1 changes the index signal added to the image signal for each frame to an index signal corresponding to the identification number of the next display unit in a step ST13 (a time point $t_{13}$ or $t_{17}$ in FIG. 7). Next, the apparatus 1 causes the pointer 51 to be displayed in a step ST14 (a time point $t_{13}$ or $t_{17}$ in FIG. 7). Next, in a step ST15, the apparatus 1 changes the page (image) and terminates the operation at the time of the page change (a time point $t_{14}$ or $t_{18}$ in FIG. 7).

As has been explained above, when the image signal generating apparatus 1 of the second embodiment, the image signal generating method that is implemented by the apparatus 1, the program for implementing the method and the computer-readable information storage medium 8 containing the program are used in the operation at the time of the page change where the display units 11, 12 and 13 to be specified by the index signal are switched by changing the index signal, a signal for displaying a pointer is not added to the image signal for each frame period during at least one frame period from a time point by at least one frame previous to a time point of the page change. As a result, the pointer can be displayed only on the selected one of the display units that is specified by the index signal.

Further, when the image signal generating apparatus 1 of the second embodiment, the image signal generating method, the program for implementing the method and the computer-readable information storage medium 8 containing the program are used in the operation at the time of the page change, the invalid index period is provided. Thus, even when a change in the image signal is not synchronized correctly with the vertical synchronizing signal, the display image will be less disturbed.

The second embodiment is the same as the first embodiment, except for the above respects.

Third Embodiment

Figure 9:
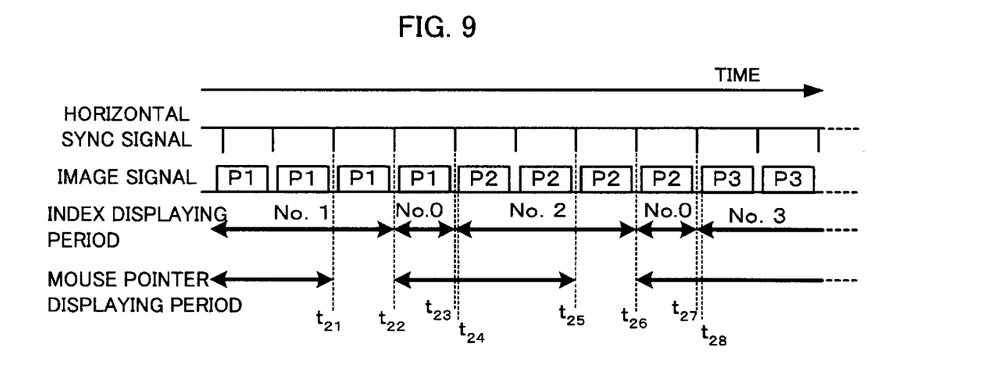
FIG. 9 is a timing chart for explaining an operation at the time of a page change in the image signal generating apparatus in accordance with in accordance with the third embodiment.
Figure 10:
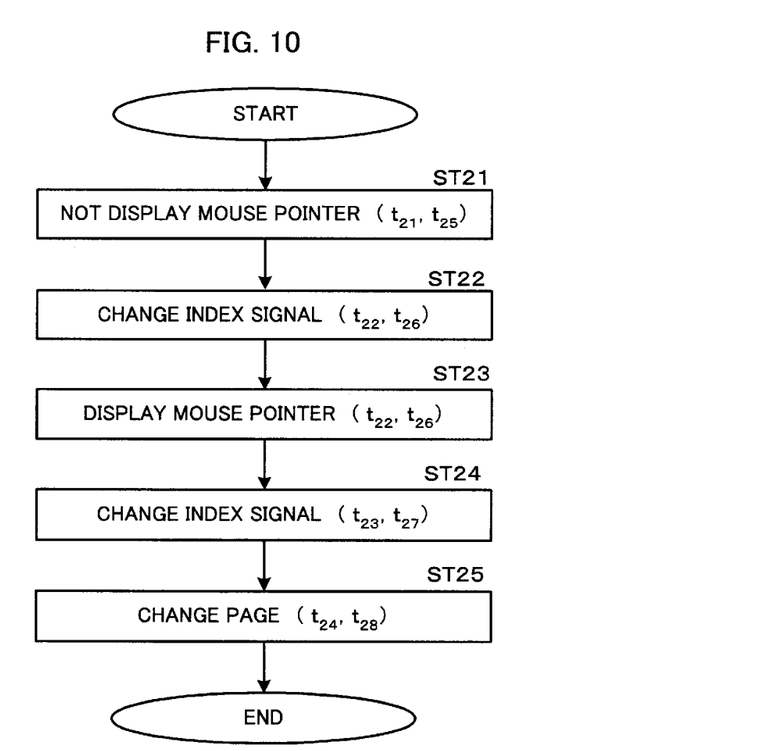
FIG. 10 is a flowchart showing the operation at the time of a page change in the image signal generating apparatus in accordance with the third embodiment.

FIG. 9 is a timing chart for explaining an operation at the time of a page change in the image signal generating apparatus 1 (that implements a image signal generating method) in accordance with the third embodiment of the present invention. Further, FIG. 10 is a flowchart showing the operation at the time of a page change in the image signal generating apparatus in accordance with the third embodiment. The image signal generating apparatus of the third embodiment is different from that of the first or second embodiment only in the operation at the time of a page change. Accordingly, an explanation of the third embodiment will be made by referring to FIGS. 1 through 4.

In FIG. 9, each of reference symbols P1 denotes a first-page image signal to be displayed on the first display unit 11, each of reference symbols P2 denotes a second-page image signal to be displayed on the second display unit 12, and each of reference symbols P3 denotes a third-page image signal to be displayed on the third display unit 13. Four frames of the first-page image signal P1 arranged sequentially in time, four frames of the second-page image signal P2 arranged sequentially in time, and two frames of the third-page image signals arranged sequentially in time are shown in FIG. 9.

As shown in FIG. 9, when the image signal generator 2 generates the first-page image signal P1, the image signal generator 2 adds an index signal (No. 1 in FIG. 9) corresponding to the identification number (No. 1 in FIG. 2) of the first display unit 11 to the image signal for each frame. When the image signal generator 2 generates the second-page image signal P2, the image signal generator 2 adds an index signal (No. 2 in FIG. 9) corresponding to the identification number (No. 2 in FIG. 2) of the second display unit 12 to the image signal for each frame. When the image signal generator 2 generates the third-page image signal P3, the image signal generator 2 adds an index signal (No. 3 in FIG. 9) corresponding to the identification number (No. 3 in FIG. 2) of the third display unit 13 to the image signal for each frame.

The operation at the time of the page change (i.e., a changeover of the display units 11, 12 and 13) is carried out by a command from the central controller 6. The central controller 6 controls the indexer 3 in such a way that the index signal is changed to an invalid index signal (No. 0) corresponding to none of the identification data of the plurality of display units during at least one frame period from a first time point $t_{22}$ (or $t_{26}$) that is at least one frame period previous to a second time point $t_{23}$ (or $t_{27}$) at which a page change is executed by changing the index signal added to the image signal for each frame. Further, the central controller 6 controls the pointer controller 4 in such a way that the pointer signal is not added to the image signal for each frame during at least one frame period from a third time point $t_{21}$ (or $t_{25}$) that is at least one frame period previous to the first time point $t_{22}$ (or $t_{26}$). In the third embodiment, a period of time during which the pointer signal is not added to the image signal for each frame is from the third time point $t_{21}$ (or $t_{25}$) to the first time point $t_{22}$ (or $t_{26}$). Since the period of time $t_{21}$ through $t_{22}$ (or $t_{25}$ through $t_{26}$), i.e., a pointer non-display period is provided, the pointer image will not be stored in the image memory (image memory 27 in FIG. 4) of the display unit that is not selected by the index signal.

As has described above, the operation at the time of the page change in the image signal generating apparatus of the third embodiment is shown in FIG. 10. Referring to FIG. 10, in the operation at the time of the page change, the apparatus 1 causes the pointer not to be displayed temporarily at least one frame period (e.g., a period of time $t_{21}$ through $t_{22}$ or $t_{25}$ through $t_{26}$) in a step ST21. Next, the apparatus 1 changes the index signal added to the image signal to an invalid index signal in a step ST22 (a time point $t_{22}$ or $t_{26}$ in FIG. 9). Next, the apparatus 1 causes the pointer 51 to be displayed in a step ST23 (a time point $t_{22}$ or $t_{26}$ in FIG. 9). Next, the apparatus 1 changes the index signal added to the image signal for each frame to an index signal corresponding to the identification number of the next display unit in a step ST24 (a time point $t_{23}$ or $t_{27}$ in FIG. 9). Next, in a step ST25, the apparatus 1 changes the page (image) and terminates the operation at the time of the page change (a time point $t_{24}$ or $t_{28}$ in FIG. 9).

As has been explained above, when the image signal generating apparatus 1 of the third embodiment, the image signal generating method that is implemented by the image signal generating apparatus 1, the program for implementing the method and the computer-readable information storage medium 8 containing the program are used in the operation at the time of the page change where the display units 11, 12 and 13 to be specified by the index signal are switched by changing the index signal, a signal for displaying a pointer is not added to the image signal for each frame during at least one frame period from a time point by at least one frame period previous to a time point of the page change. As a result, the pointer can be displayed only on the selected one of the display units that is specified by the index signal.

Further, when the image signal generating apparatus 1 of the third embodiment, the image signal generating method, the program for implementing the method and the computer-readable information storage medium 8 containing the program are used in the operation at the time of the page change, the invalid index period is provided. Thus, even when a change in the image signal is not synchronized correctly with the vertical synchronizing signal, the display image will be less disturbed.

The third embodiment is the same as the first or second embodiment except for the above respects.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image signal generating apparatus which transmits an image signal to a plurality of display units each having identification data, comprising:

an image signal generator which sequentially generates an image signal for each frame that is an image signal for displaying one page image in one frame period, the one page image being an image to be displayed on each of the plurality of display units;

an indexer which adds an index signal to the image signal for each frame;

a pointer controller which controls addition or non-addition of a pointer signal to the image signal for each frame, the pointer signal being a signal for displaying a pointer on each of the plurality of display units;

an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame; and a central controller which controls the pointer controller in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

2. The image signal generating apparatus according to claim 1, wherein a period of time during which the pointer signal is not added to the image signal for each frame is from the first time point to the second time point.

3. An image signal generating apparatus which transmits an image signal to a plurality of display units each having identification data, comprising:

an image signal generator which sequentially generates an image signal for each frame that is an image signal for displaying one page image in one frame period, the one page image being an image to be displayed on each of the plurality of display units;

an indexer which adds an index signal to the image signal for each frame;

a pointer controller which controls addition or non-addition of a pointer signal to the image signal for each frame, the pointer signal being a signal for displaying a pointer on each of the plurality of display units;

an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame; and a central controller which controls the indexer and the pointer controller;

wherein the central controller controls the indexer in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and wherein the central controller controls the pointer controller in such a way that the pointer signal is not added to the image signal for each frame during at least one frame period from a third time point that is at least one frame period previous to the first time point.

4. The image signal generating apparatus according to claim 3, wherein a period of time during which the pointer signal is not added to the image signal for each frame is from the third time point to the second time point.

5. The image signal generating apparatus according to claim 3, wherein a period of time during which the pointer signal is not added to the image signal for each frame is from the third time point to the first time point.

6. An image signal generating method for transmitting an image signal to a plurality of display units each having identification data, comprising:

sequentially generating an image signal for each frame that is an image signal for displaying one page image in one frame period, the one page image being an image to be displayed on each of the plurality of display units;

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame; and controlling the pointer controller in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

7. The image signal generating method according to claim 6, wherein a period of time during which the pointer signal is not added to the image signal for each frame is from the first time point to the second time point.

8. An image signal generating method for transmitting an image signal to a plurality of display units each having identification data, comprising:

sequentially generating an image signal for each frame that is an image signal for displaying one page image in one frame period, the one page image being an image to be displayed on each of the plurality of display units;

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame;

controlling the indexer in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling the pointer controller in such a way that the pointer signal is not added to the image signal for each frame during at least one frame period from a third time point that is at least one frame period previous to the first time point.

9. The image signal generating method according to claim 8, wherein a period of time during which the pointer signal is not added to the image signal for each frame is from the third time point to the second time point.

10. The image signal generating method according to claim 8, wherein a period of time during which the pointer signal is not added to the image signal for each frame is from the third time point to the first time point.

11. A computer-readable information storage medium which contains a program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame; and controlling in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

12. The computer-readable information storage medium according to claim 11, wherein a period of time during which the pointer signal is not added to the image signal for each frame is from the first time point to the second time point.

13. A computer-readable information storage medium which contains a program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame;

controlling in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling in such a way that the pointer signal is not added to the image signal for each frame during at least one frame period from a third time point that is at least one frame period previous to the first time point.

14. The computer-readable information storage medium according to claim 13, wherein a period of time during which the pointer signal is not added to the image signal for each frame is from the third time point to the second time point.

15. The computer-readable information storage medium according to claim 13, wherein a period of time during which the pointer signal is not added to the image signal for each frame is from the third time point to the first time point.

16. A program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame; and controlling in such a way that the pointer signal is not added to the image signal for each frame during at least one frame period from a first time point that is at least one frame period previous to a second time point at which the display unit for displaying the one page image based on a received image signal is changed by changing the index signal added to the image signal for each frame.

17. The program according to claim 16, wherein a period of time during which the pointer signal is not added to the image signal for each frame is from the first time point to the second time point.

18. A program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

adding an index signal to the image signal for each frame;

controlling addition or non-addition of a pointer signal to the image signal for each frame, the pointer signal being a signal for displaying a pointer on each of the plurality of display units;

sequentially transmitting the image signal for each frame to the plurality of display units, thereby causing any of the plurality of display units having identification data corresponding to the index signal added to the transmitted image signal for each frame to display an image based on the transmitted image signal for each frame;

controlling in such a way that the index signal is changed to an invalid index signal corresponding to none of the identification data of the plurality of display units during at least one frame period from a first time point that is at least one frame period previous to a second time point at which the display unit for displaying the one page image based on a received image signal is changed by changing the index signal added to the image signal for each frame; and controlling in such a way that the pointer signal is not added to the image signal for each frame during at least one frame period from a third time point that is at least one frame period previous to the first time point.

19. The program according to claim 18, wherein a period of time during which the pointer signal is not added to the image signal for each frame is from the third time point to the second time point.

20. The program according to claim 18, wherein a period of time during which the pointer signal is not added to the image signal for each frame is from the third time point to the first time point.

* * * * *